US012208837B2

(12) United States Patent
Stack et al.

(10) Patent No.: US 12,208,837 B2
(45) Date of Patent: Jan. 28, 2025

(54) INTEGRATED COMPONENTS FOR VEHICLES

(71) Applicant: Tesla, Inc., Austin, TX (US)

(72) Inventors: Marcus Stack, Palo Alto, CA (US); Mitchell Heinzmann, Sunnyvale, CA (US); Ismael Pinsonneault, Sunnyvale, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/566,364

(22) PCT Filed: Jun. 8, 2022

(86) PCT No.: PCT/US2022/032708
§ 371 (c)(1),
(2) Date: Dec. 1, 2023

(87) PCT Pub. No.: WO2022/261236
PCT Pub. Date: Dec. 15, 2022

(65) Prior Publication Data
US 2024/0262428 A1    Aug. 8, 2024

Related U.S. Application Data

(60) Provisional application No. 63/202,402, filed on Jun. 9, 2021.

(51) Int. Cl.
*B62D 21/16* (2006.01)
*B62D 21/11* (2006.01)

(52) U.S. Cl.
CPC .............. *B62D 21/16* (2013.01); *B62D 21/11* (2013.01)

(58) Field of Classification Search
CPC ........ B62D 21/16; B62D 21/11; B62D 21/00; B62D 21/17; B62D 25/082; B62D 25/24;
(Continued)

(56) References Cited

U.S. PATENT DOCUMENTS

2018/0066796 A1* 3/2018 Heon ...................... B21C 23/10

FOREIGN PATENT DOCUMENTS

| CN | 117425591 | 1/2024 |
|---|---|---|
| DE | 10 2007 019 062 | 11/2008 |

(Continued)

OTHER PUBLICATIONS

Geelink, DE 102007019062 A1, Machine Translation of Specification (Year: 2008).*
(Continued)

*Primary Examiner* — Drew J Brown
*Assistant Examiner* — Matthew Joseph Ganci
(74) *Attorney, Agent, or Firm* — Schwegman Lundberg & Woessner, P.A.

(57) ABSTRACT

Some examples relate to the configuration or management of an integrated component that provides structural component functionality for a vehicle, such as a cross member that absorbs loads placed on the vehicle. Additionally, the integrated component illustratively further provides air reservoir functionality that for one or more additional vehicle components. In some examples, an integrated component can provide structural component functionality associated with a cross member mounted between shock towers and air reservoir functionality to provide compression air such as for active or semi-active vehicle suspension systems.

20 Claims, 8 Drawing Sheets

(58) Field of Classification Search
CPC ...... F17C 2205/0103; F17C 2205/0107; F17C 2205/0111; F17C 2205/018; F17C 2270/0178
See application file for complete search history.

(56) References Cited

FOREIGN PATENT DOCUMENTS

| | | | | |
|---|---|---|---|---|
| DE | 102007019062 A1 | * | 11/2008 | ............. B62D 21/16 |
| EP | 4351954 | | 4/2024 | |
| WO | 2022261236 | | 12/2022 | |

OTHER PUBLICATIONS

International Search Report and Written Opinion for International Application No. PCT/US2022/032708, Notification mailed Sep. 19, 2022.
"International Application Serial No. PCT US2022 032708, International Preliminary Report on Patentability mailed Dec. 21, 2023", 8 pgs.
"European Application Serial No. 22740695.6, Response filed Apr. 29, 2024 to Communication pursuant to Rules 161(2) and 162 EPC mailed Nov. 30, 2023", 7 pgs.

* cited by examiner

INTEGRATED COMPONENTS FOR VEHICLES

CROSS-REFERENCE TO RELATED APPLICATION

This application claims the benefit of U.S. Provisional Application No. 63/202,402, entitled INTEGRATED COMPONENTS FOR VEHICLES, and filed on Jun. 9, 2021. U.S. Provisional Application No. 63/202,402 is incorporated by reference herein.

BACKGROUND

Generally described, a variety of vehicles, such as electric vehicles, combustion engine vehicles, hybrid vehicles, etc., can be configured with various components to facilitate operation of the vehicle. Traditionally, many components are specifically configured in accordance with the specifications required to implement the specified functionality. For example, attributes of structural components within a vehicle (e.g., materials, dimensions, mounting, etc.) are specified and selected in a manner that meets or exceeds loads placed on the structural components. Other components, such as passenger compartment components, suspension components, display components, etc. are configured with selected attributes related respective functionality of the components.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
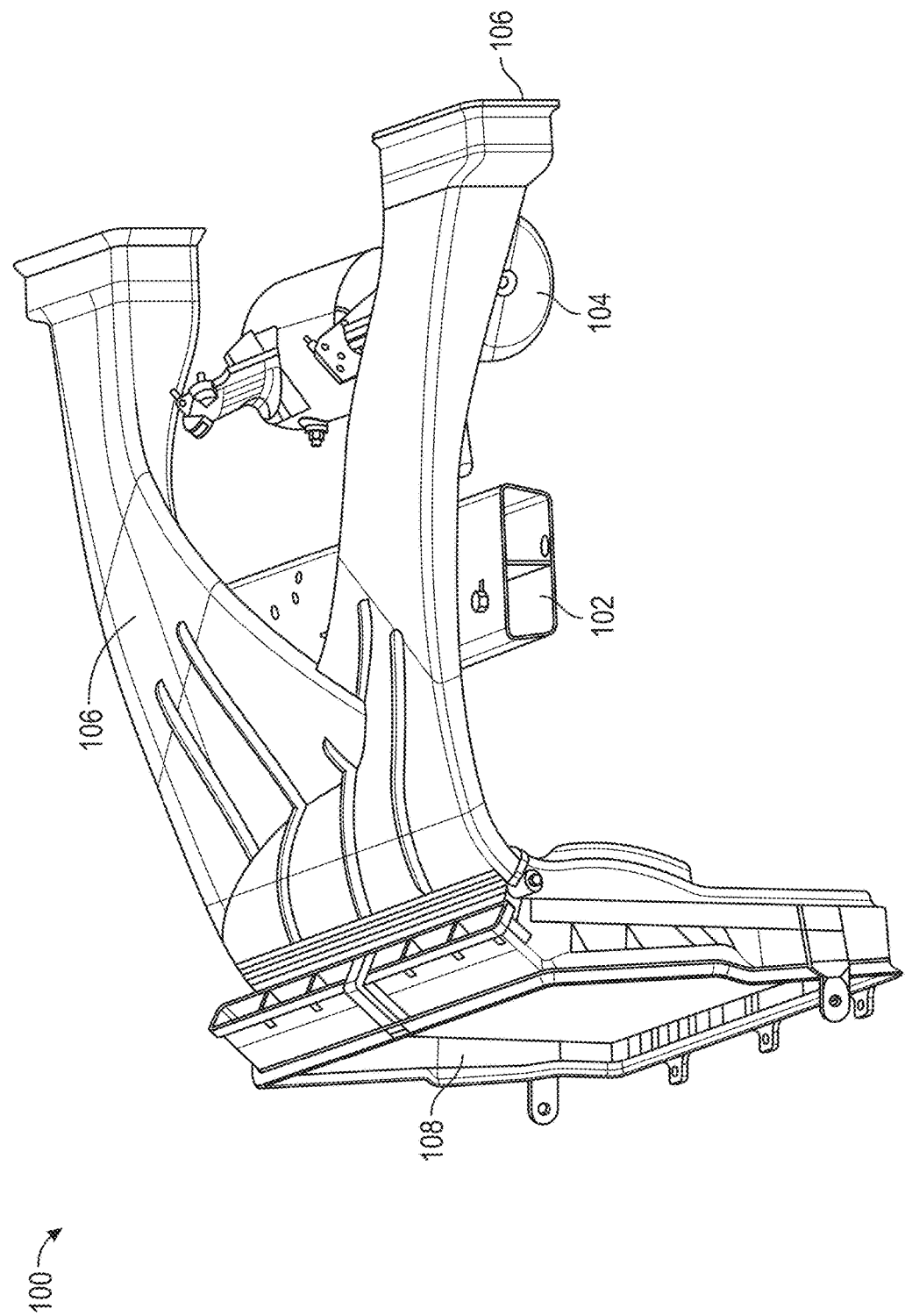
FIG. 1 illustrates a configuration of a portion of a vehicle compartment including an independent structural component, such as a shock tower cross member, an air reservoir component for suspension systems, air ducting and air filters in accordance with one or more aspects of the present application.

Generally described, one or more aspects of the present disclosure relate to the configuration and management of one or more components that integrate separate mechanical functionality implemented in a vehicle. More specifically, one or more aspects of the present application relate to the configuration or management of an integrated component that provides structural component functionality for a vehicle, such as a cross member that absorbs loads placed on the vehicle. Additionally, the integrated component illustratively further provides air reservoir functionality that for one or more additional vehicle components. By way of illustrative embodiment, the integrated component can illustratively provide structural component functionality associated with a cross member mounted between shock towers and air reservoir functionality to provide compression air such as for active or semi-active vehicle suspension systems.

Traditionally, vehicle components may be configured and manufactured to perform a single, primary function. For example, structural components may be configured according to materials, dimensions, mounting mechanism and other attributes to meet or exceed anticipated structural loads placed on the structural components. Such structural components have not traditional provided additional functionality, such as functioning as a reservoir for fluids used in the operation of the vehicle. Similarly, other components in the vehicle are typically configured with materials, dimensions, mounting mechanism and other attributes to meet the functionality requirements of the component (e.g., a mechanical reservoir for providing fluids to the vehicle). Although these additional components necessarily have some structural properties, these components are not configured in a manner to meet or exceed load demands, such as required for traditional structural components.

Many traditional combustion engine vehicles include compartments dedicated for placement of the combustion engine, suspension systems and related components, and the like. In such embodiments, these compartments are dedicated exclusively, or primarily, to the intended components. Accordingly, potential gains in terms of increased component density by way of integration is not required or otherwise results in realizable benefits. Likewise, traditional combustion engine vehicles may often not benefit from potential weight savings based on elimination of many types of components that do not significantly affect the total weight of the vehicle.

As will be described in greater details, aspects of the present application relate to integration of two independent components utilized in the operation of a vehicle into a single part, thereby optimizing the use of space, reducing mass, and complexity. Illustratively, as incorporated in a vehicle, such as an electric vehicle, compartment spaces traditionally allocated for engines (e.g., a combustion engine) provides opportunities for gains Illustratively, the integrated component of the present application leverages a central extrusion with welded end caps to enable sufficient stress management. Additionally, the integrated component facilitates the ability for bolted interfaces on wings for mounting to shock towers, and carrying additional components (controllers, thermal system, LV battery, harnesses, etc.). The integrated component of the present application significantly improves under hood packaging density resulting in reduced, mass, cost, and package density. Additionally, the integrated components of the present application can be configured to increase or optimize available space for consumer use, such as larger truck space (forward and rear), and the like.

FIG. 1 illustrates a configuration of a portion 100 of a vehicle compartment including an independent structural component(s). The independent structural component, such as a shock tower cross member 102, an air reservoir component for suspension systems 104, air ducting 106 and air filters 108. As illustrated in FIG. 1, each component, namely, 102, 104, 106, 108, is configured for an individual function and is not configured for additional functionality or otherwise incorporates a combination of functionality. For example, shock tower cross member 102 does not provide any functionality related to air reservoir component 104.

Figure 2:
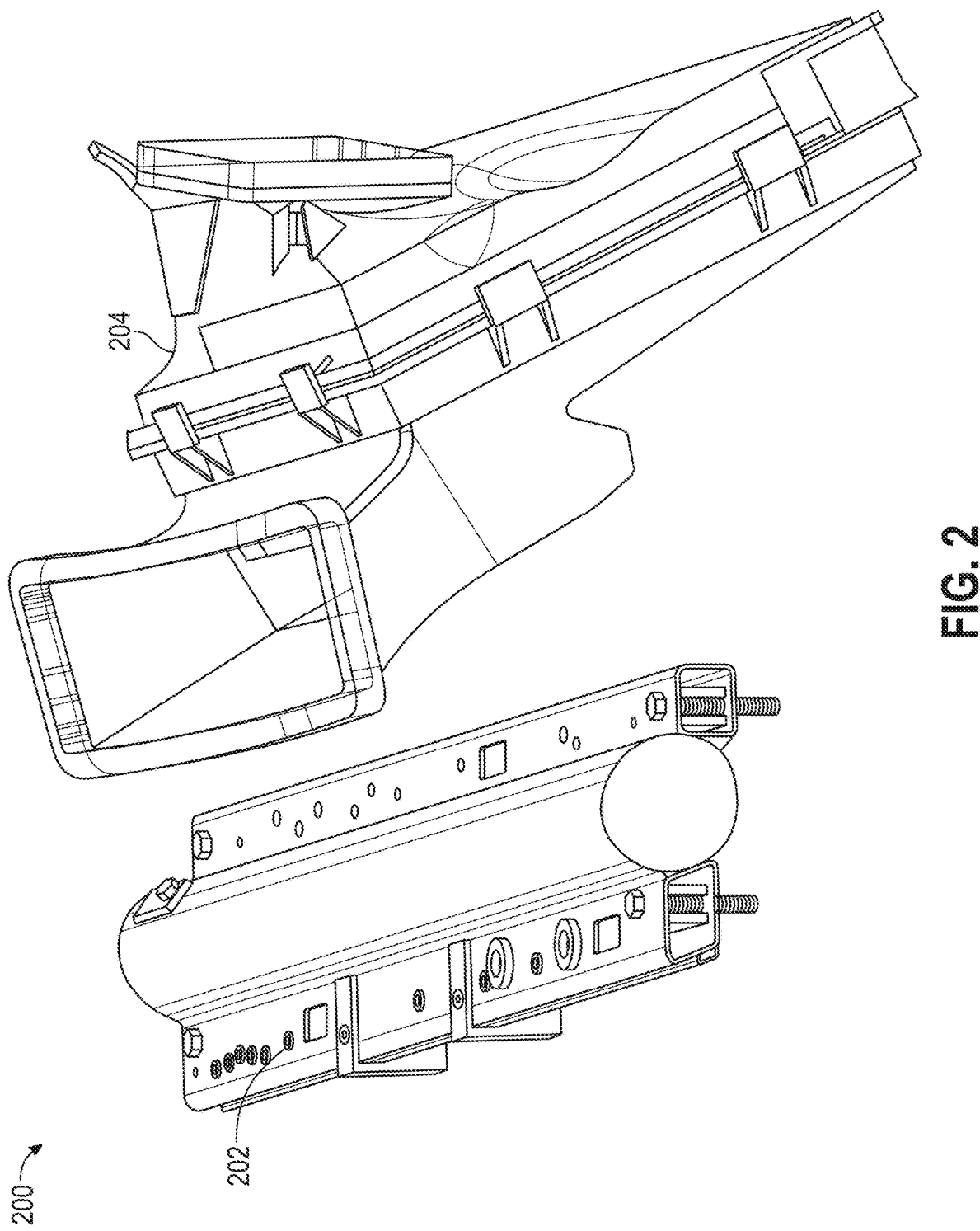
FIG. 2 is a representation an integrated component that implements two distinct mechanical functionalities in accordance with aspects of the present application.

FIG. 2 is a representation a system 200 including an integrated component 202 that implements two distinct mechanical functionalities. In accordance with illustrative embodiments of the present application, the integrated component 202 is configured and functions as a structural cross member support between two components in a vehicle. In one embodiment, the structural cross member can be mounting between shock tower components. Additionally, the integrated component 202 functions as an air reservoir for suspension systems. Additional discussion of the integrated component will be described herein. As also illustrated in FIG. 2, the system 200 can include additional components that provide functionality to a vehicle. Illustratively, the additional components of the system can include a common air filter housing and air ducting 204.

The system 200 in FIG. 2 enables the reduction of a plurality of additional parts or components, such as battery shields, reservoir pump brackets, and additional ducting, some of which is illustrated in FIG. 1. Additionally, in some embodiments, the integrated component 202 can be applied to multiple vehicle types, that would have otherwise been configured with separate, independently configured structural components. This improves manufacturing and assembly by have an integrated component part common to multiple vehicles. Accordingly, one or more aspects of the present application should not be limited to structural cross members between shock tower components. Additionally, the additional components illustrated in FIG. 2, namely, the common air filter housing and air ducting 204, can include additional or alternative components in accordance with aspects of the present application. Accordingly, aspects of the present application can be realized with the combination of at least a portion of the functionality, namely, structural components and air reservoir sources, that were previously independently separate components.

Figure 3:
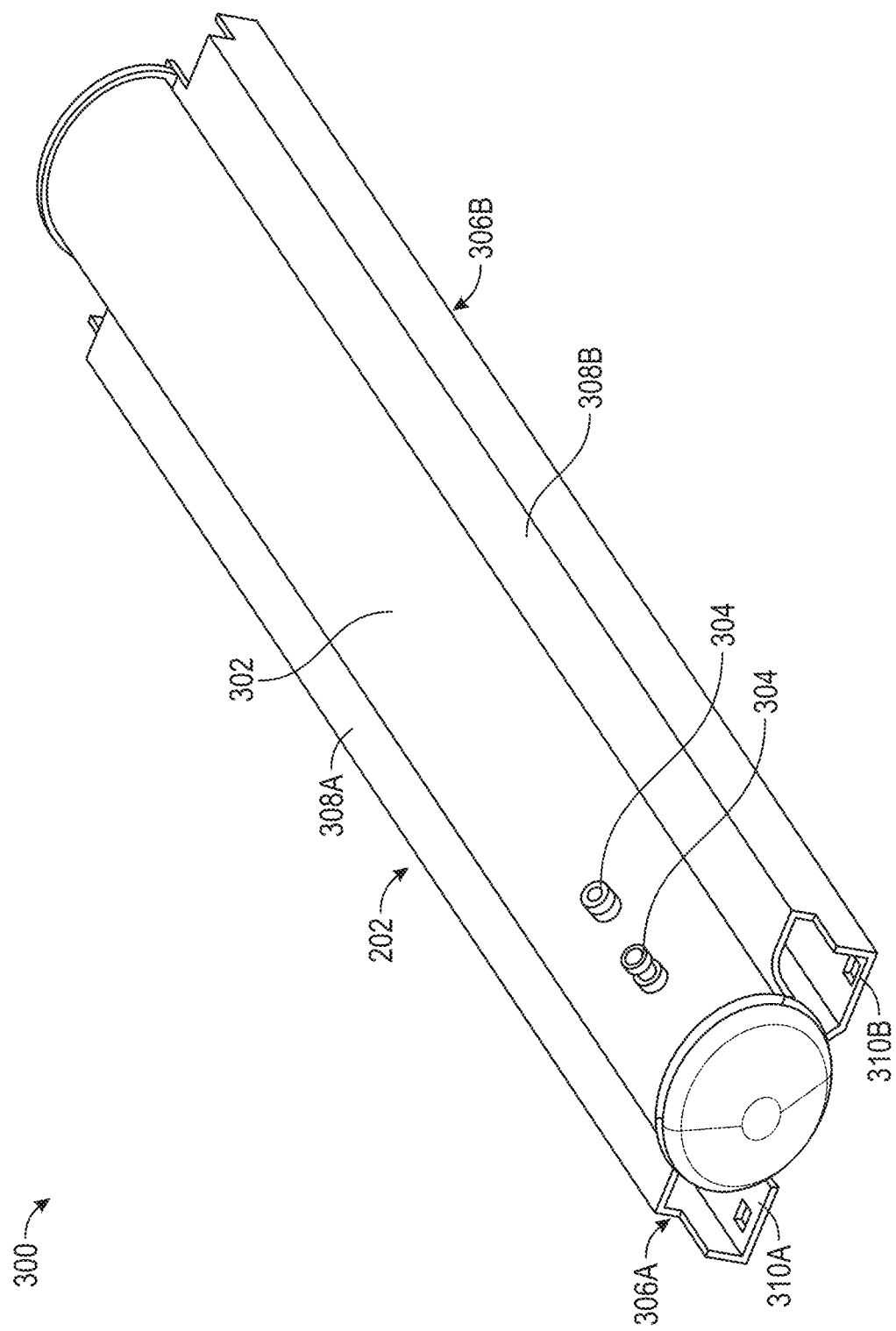
FIG. 3 is a representation of the integrated component of FIG. 2 according to illustrative embodiments of the present application.

FIG. 3 is a representation 300 of the integrated component 202 (FIG. 2) according to an illustrative embodiment of the present application. The integrated component 202 includes a first portion 302 of a substantially cylindrical shape configured to provide a cavity that functions as a reservoir for pressurized fluid. The first portion 302 functions as a first mechanical function of the integrated component. The first portion 302 of the integrated component may be of different shapes such as a compressed cylindrical (e.g., teardrop) or non-uniform geographic shapes, that may facilitate mounting or incorporation of the integrated component 202 in a vehicle compartment.

The dimension of the first portion 302, such as the diameter of the cylindrical shape, can be specified based on the volume of pressurized fluid that will be maintained in the first portion. As illustrated in FIG. 3 and in FIGS. 5 and 7, the first portion 302 includes two or more ports that function as interface for other components accessing the pressurized flue in the first portion 302 (e.g., the air reservoir). Illustratively, the two or more ports 304 may be constructed utilizing flow drilling that mitigates the need for additional welds for the ports 304. This facilitates minimization of an additional source of potential leaks or stress concentration in the pressure first portion. The thickness of the first portion 304 (e.g., cylindrical shape) may be selected in view of the performance/attributes of the material utilized in the construction of the integrated component, the manner of formation of the integrated component, and the pressure at which fluid will be maintained. Although the ports 304 are illustrated in FIG. 3 as mounted along a longitudinal surface of the first portion 302, one or more ports 304 may be include in other locations along the first portion 302, including on the end caps.

The integrated component 202 also includes a second portion 306 that functions as additional structural support mechanism for the second mechanical function of the integrated component. The second portion 306 of the integrated component 202 is in the form of two wings 306A 306B having substantially flat top surface 308A, 308B and bottom surfaces 310A, 310B. The top and bottom surfaces (308A, 308B, 310A, 310B) further present one or more surfaces for mounting the integrated component to the vehicle, such as via two shock towers (not illustrated). Accordingly, reference to the second portion 306 may generally include a single wing 306A or 306B or a combination of wings 306A and 306B.

Illustratively, the top and bottom surfaces 308 and 310 of the wings 306 can also facilitate the mounting of additional components utilized in the vehicle, thereby eliminating or replacing separate, additional mounting structures for the additional components. The dimensions of the second portion 306 (e.g., the length and width and depth of the wings 306A, 306B) can vary based on the structural support characteristics of the materials utilized to construct the integrated component and the desired surface area of the wings to function as additional mounting surface for other components. As illustrated in FIG. 3, the wings 306A, 306B may be placed in a diametrically opposite position relative to the cylindrical first portion. Additionally, as illustrated in FIG. 3, the dimensions of wing 306A and 306B may be substantially similar, within manufacturing tolerances.

In some embodiments, the first and second wings 306A and 306B illustratively may be manufactured in a slightly offset position relative to each other to facilitate incorporation of the integrated component 202 in a compartment of the vehicle or to facilitate placement of the integrated component adjacent a lid or hood and allow closure of the lid or hood. In other embodiments, the dimensions of the individual wings 306A and 306B may vary to accommodate for either mounting to the structural cross members, mounting of additional equipment, or a combination thereon.

The integrated component 202 (or portions of the integrated component) is illustratively formed of aluminum or other similar material, such as by push extrusion manufacturing. In other embodiments, the integrated component 202 may be manufacturing using other techniques, including, but not limited, hydrostatic extrusion, impact extrusion, indirect extrusion, direct extrusion, or any variation thereof. Still further, in yet other embodiments, the integrated component 202 (or portions of the integrated component) may be manufactured using high pressure die cast techniques.

Figure 4:
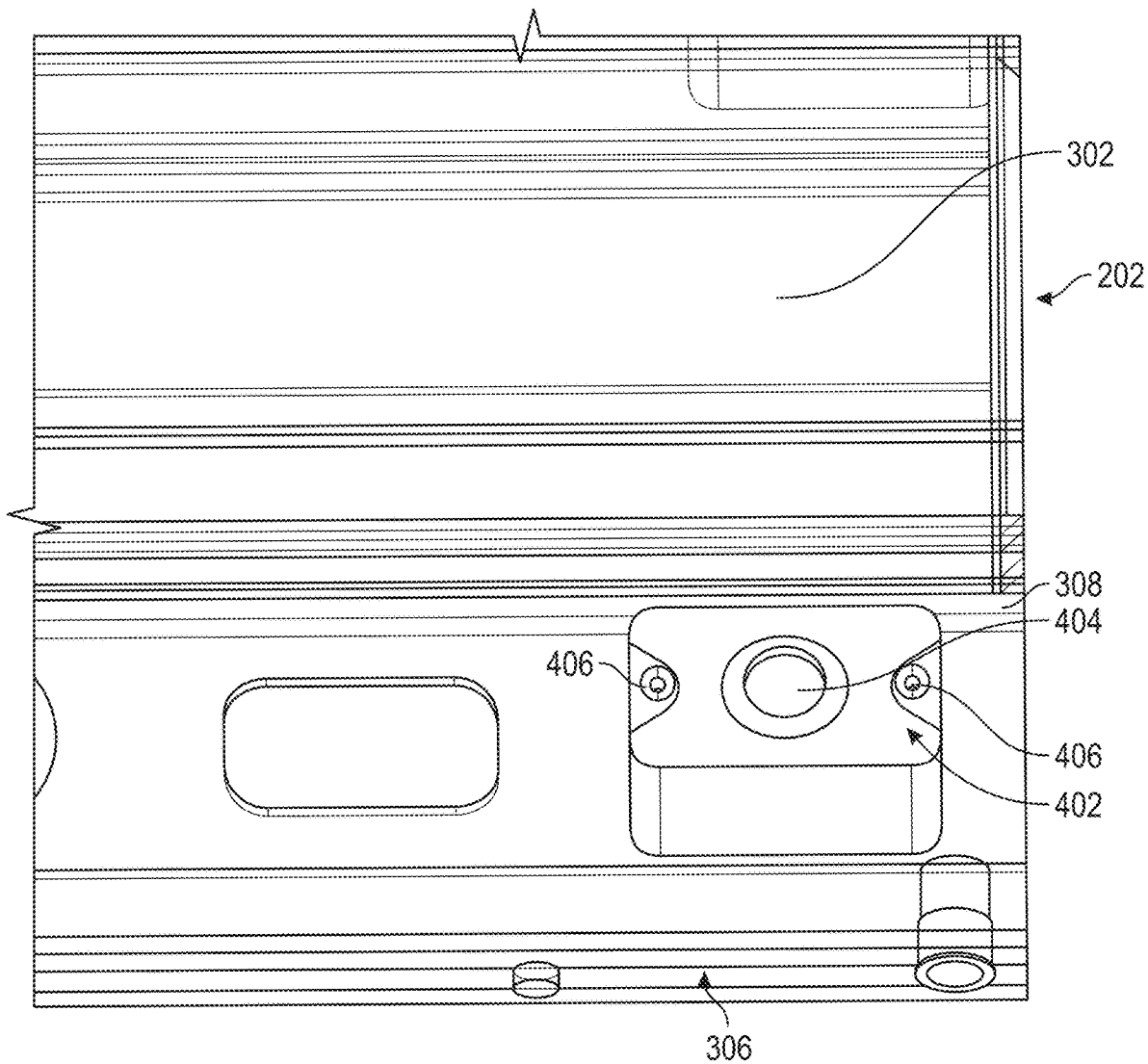
FIG. 4 is a representation of the integrated component of FIG. 2 according to illustrative embodiments of the present application.
Figure 5:
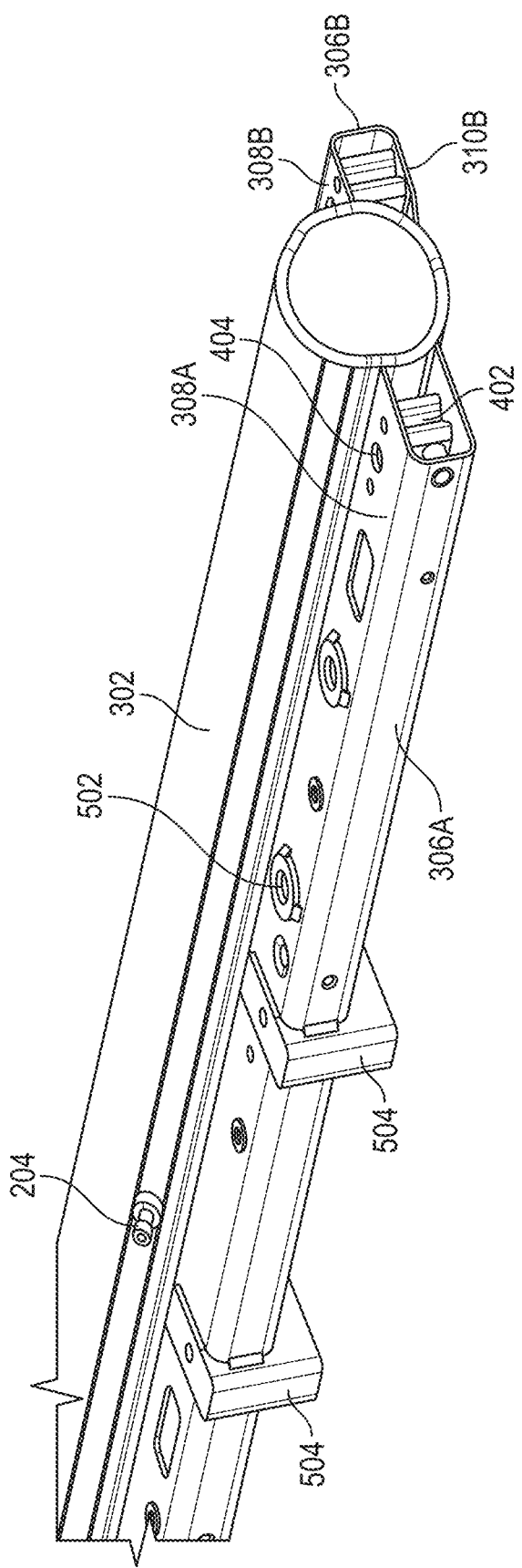
FIG. 5 is a representation of the integrated component of FIG. 2 according to illustrative embodiments of the present application.

With reference to FIGS. 4 and 5, in an illustrative embodiment, the second portion (e.g., the wings 306A or 306B) can further include mounting mechanism(s) for affixing the integrated component to the vehicle. Specifically, in one embodiment, the integrated component 202 may be fixed to a vehicle utilizing self-tapping mechanism, such as a screw or bolt, that allows the integrated component to have a common ground connection with the mounting surface of the vehicle. As described above, in one embodiment, the mounting surfaces of the vehicle correspond to shock towers in which the integrated component 202 functions as a cross member between the shock towers.

Referring again to FIGS. 4 and 5, the second portion can also incorporate extruded inserts 402 that provide additional torsional rigidity between the wings and the connections to the mounting surfaces of the vehicle. The above-described self-tapping mechanism(s) can be inserted via openings 404. Additionally, in some embodiments, the extruded inserts 406 may be affixed to the wings 306 via one or more dimples 406 for keeping the fixed to the wing without additional welding or other mounting structures (e.g., screws).

Illustratively, in embodiments in which mounting is facilitated utilizing screws or bolts, the incorporation of the integrated component 202 during the manufacturing process may vary. More specifically, the utilization of screw/bolt mechanisms in lieu of traditional welding mounting for a solely structural component allows for incorporation of the integrated component at different times in the manufacturing processes. This provides for earlier access of components directly mounted below the location of the integrated component.

With reference to FIG. 5, as described above, in illustrative embodiment, the second portion 306 (illustrated as 306A) can include mounting surfaces and associated structures for receiving additional components of a vehicle such as manifolds, pumps, battery components, ventilation assemblies, and the like. Illustratively, the surfaces 308A, 310A of the second portion 306A may be of a particular dimension to facilitate coupling with the additional components or receiving additional mounting mechanisms, such as clips, screws bolts, and the like. As illustrated in FIG. 5, the top surface 308A can include a first set of openings 502 for receiving and mounting additional component. The openings 502 can illustratively include additional fasteners for securing the components to the wing 306A. In other embodiments, the openings 502 can be supported with solid inserts for using self-tapping screws or other mounting mechanisms. The top and bottom surface can further include mounting brackets 504 that can serve to hold and affix the additional components described herein. Illustratively, the size and location of the openings 502 and brackets 504 can vary according to the type of components being mounted and available geometry within a vehicle compartment. Additionally, as described above, the dimensions of the top and bottom surface 308, 310 can vary to accommodate required surface areas for mounting the additional components.

Figure 6:
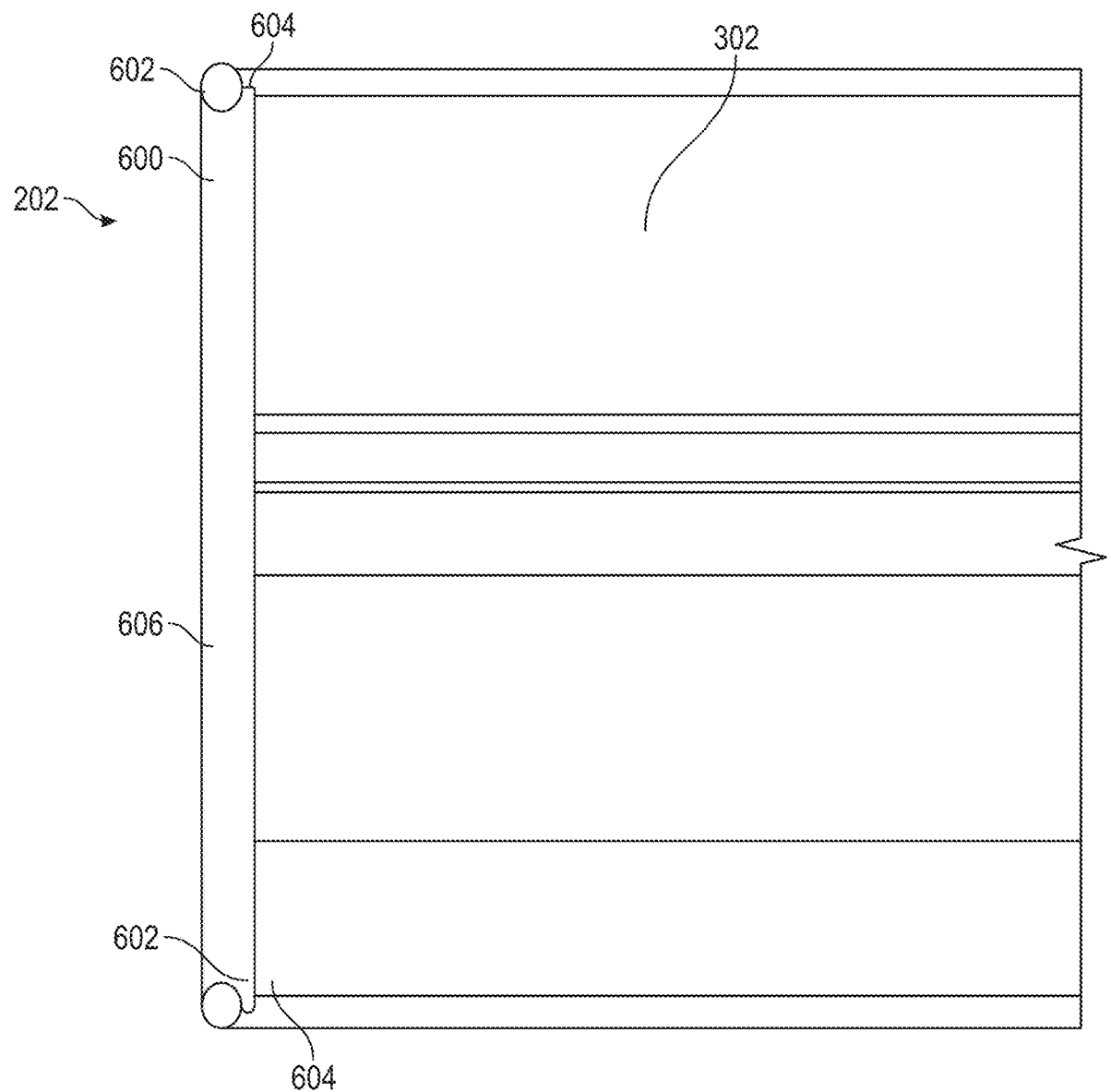
FIG. 6 is a representation of the integrated component of FIG. 2 illustrating an end cap of the integrated component according to illustrative embodiments of the present application.

Referring now to FIG. 6, in an illustrative embodiment, the first portion 302 implementing the air reservoir functionality can further include end caps 600 that facilitate retention of the pressurized fluid. Illustratively, the end caps 600 can be welded to the body of the first portion 602 such that the fluid is sealed within the cavity formed by the first portion 302. Additionally, in some embodiments, the edges 602 of the cylindrical (or substantially cylindrical) portion may be chamfered to facilitate a full weld and mitigate end cap failure. The cylindrical portion may also have a small ledge 604 on the extrusion, as illustrated in FIG. 6, to allow for contact with the end cap 600. As further illustrated in FIG. 6, in some embodiments, the outer surface 606 of the end cap 600 is substantially flat, which may facilitate inclusion in the vehicle compartment. In other embodiments, the outer surface of the end caps 306 may have a curved shape (e.g., spherical shaped). In this embodiment, the shape and dimensions of the end caps 600 may be modified based on the pressure in which the fluid is maintained in the first portion 302. Additionally, one or more of the end caps may be manufactured with the body portion of the first portion 302.

Figure 7:
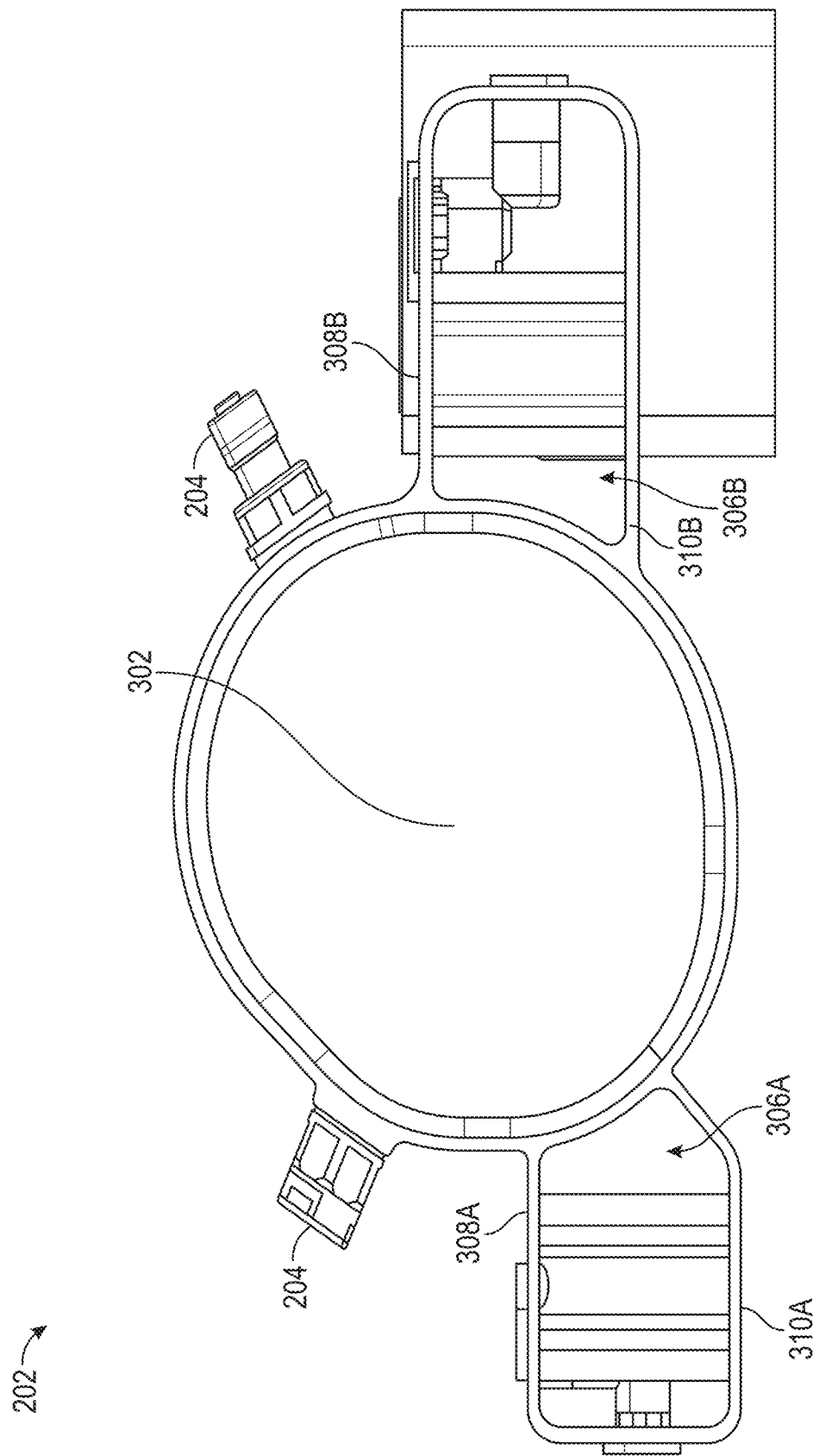
FIG. 7 represents a cross-section of the integrated component illustrating various aspects of the present application, including a non-uniform cylindrical shape for the air reservoir portion of the integrated component.

FIG. 7 illustrates a cross-section of the integrated component 202. As illustrated in FIG. 7, in one embodiment the first portion 302 does not have uniform cylindrical cross section. Accordingly, in some embodiments, a cavity defined by the first portion 302 may be modified to accommodate for other components in a vehicle compartment or the dimensions of the vehicle compartment. As also illustrated in FIG. 7, the wings 306A and 306B are offset relative to each other. Additionally, the wings 306A and 306 have different dimension (e.g., a first dimension and a second dimension). The attributes of the dimensions of the wings may be attributable to the mounting requirements for the integrated component to the vehicle or structural supports. Additionally, or alternatively, the attributes of the dimensions may also be attributable to the mounting requirements of additional components mounted to the integrated component, as described previously.

Figure 8:
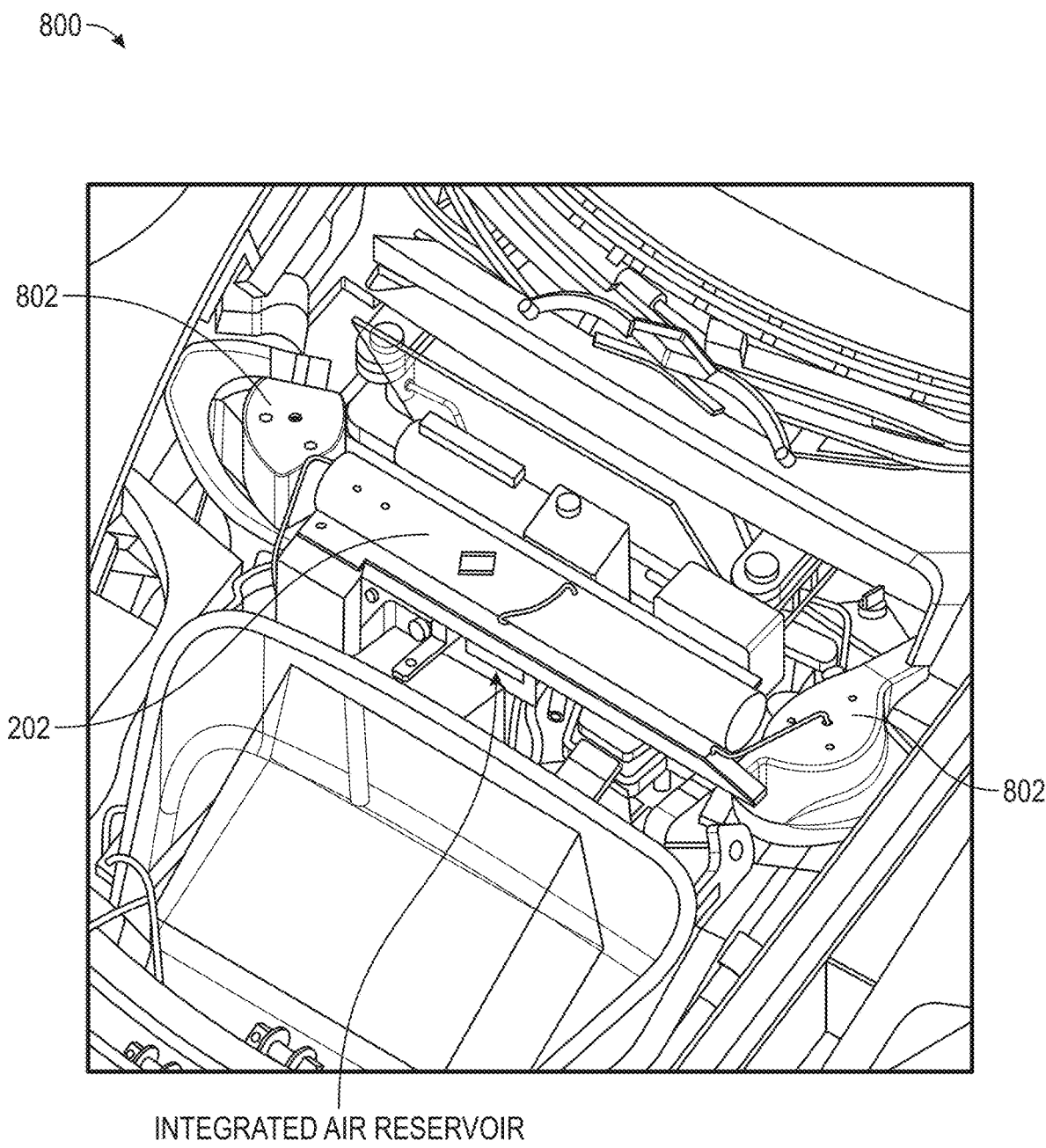
FIG. 8 illustrates the mounting of the integrated component between shock towers in a front compartment of a vehicle, such as an electric vehicle.

FIG. 8 illustrates the mounting of the integrated component 202 between shock towers 802 in a front compartment 800 of a vehicle, such as an electric vehicle. One skilled in the relevant art will appreciate, however, that the integrated component 202 is not limited to mounting between shock towers 802. Although multiple embodiments of the present application are described and illustrated in an electric vehicle, one skilled in the relevant art will appreciate that an integrated component 202 of the present application may be applied and incorporated into other types of apparatus, including, but not limited, aircraft, boats, commercial vehicles, or machinery. Additionally, while the integrated component 202 has been illustrated as providing structural support for shock towers in a vehicle, the integrated component may be configured to provide structural support between any variety of components. Still further, although the integrated component has been illustrated and described with regard to a second mechanical function as a reservoir for suspension systems, the first component of the integrated component may be configured to provide pressurized fluid to any number of other components or for different types of functionality in which pressurized fluids are utilized. Accordingly, the disclosed embodiments are illustrative in nature and should not be construed as limiting.

Additionally, the dimensions of the integrated component 202 are illustratively variable based on a distance between the mounting components (e.g., shock towers), the geometry of the vehicle component 800, the dimensions of component mounted on the integrated component 202 and the dimensions of other components not mounting on the integrated component but located within the vehicle compartment 800. Accordingly, the dimensions of the integrated component may vary according to any individual criterion or combination of criteria as described herein.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary.", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application

What is claimed:

1. An integrated component comprising:
   a first portion of the integrated component defining a hollow cavity providing a fluid reservoir for maintaining fluid, wherein the first portion includes at least one fluid port for one of receiving or providing fluid; and
   a second portion of the integrated component defining a structural support between two mounting members, the second portion including a pair of opposed wings mounted to and extending alongside the first portion in a longitudinal direction thereof, wherein each wing includes a top surface, a bottom surface and at least one extruded insert for receiving a self-tapping screw to affix the integrated component to the two mounting members.

2. The integrated component of claim 1, wherein the first portion has a uniform cylindrical cross-section.

3. The integrated component of claim 1, wherein the first portion has a non-uniform cross-section.

4. The integrated component of claim 1, wherein the first portion include a pair of end caps at ends of the hollow cavity.

5. The integrated component of claim 4, wherein first portion includes one or more chambered edges to receive the end caps.

6. The integrated component of claim 4, wherein the at least one fluid port is mounting on an end cap of the pair of end caps.

7. The integrated component of claim 1, wherein the at least one fluid port includes a plurality of fluid ports.

8. The integrated component of claim 1, wherein the at least one extruded insert includes a pair of dimples for affixing the at least one extruded insert to the pair of opposing wings.

9. The integrated component of claim 1, wherein the pair of opposing wings are affixed to the first portion such that the pair of wings are relatively diametrically opposed.

10. The integrated component of claim 1, wherein the pair of opposing wings are affixed to the first portion such that the pair of wings are relatively offset.

11. The integrated component of claim 1, wherein the pair of opposing wings have common dimensions.

12. The integrated component of claim 1, wherein the pair of opposing wings have different dimensions.

13. The integrated component of claim 1, wherein at least one wing of the pair of wings includes at least one mounting bracket for affixing additional components to the integrated component.

14. The integrated component of claim 1, wherein at least one wing of the pair of wings includes at least one mounting structure for affixing additional components to the integrated component.

15. The integrated component of claim 1, wherein the two mounting members includes a pair of shock towers associated with a vehicle.

16. An integrated component comprising:
    a first portion of the integrated component defining a hollow cavity providing a fluid reservoir for maintaining fluid, wherein the first portion includes a plurality of fluid ports for receiving or providing fluid and a set of end caps; and
    a second portion of the integrated component defining a structural support between two mounting members defined within a vehicle, the second portion including a pair of opposed wings mounted to and extending alongside the first portion in a longitudinal direction thereof, wherein each wing includes a top surface and a bottom surface.

17. The integrated component of claim 16, wherein the first portion includes at least one of a teardrop cross-section.

18. The integrated component of claim 16, wherein the pair of opposing wings each include at least one extruded insert for receiving a mounting component to affix the integrated component to the two mounting members.

19. The integrated component of claim 16, wherein at least one wing of the pair of wings includes at least one mounting bracket for affixing additional components to the integrated component.

20. An integrated component comprising:
    a first portion of the integrated component defining a hollow cavity providing a fluid reservoir for maintaining fluid, wherein the first portion includes a plurality of fluid ports for receiving or providing fluid and a set of end caps; and
    a second portion of the integrated component defining a structural support between two mounting members defined within a vehicle, the second portion including a pair of opposed wings affixed to and extending alongside the first portion in a longitudinal direction thereof and defining at least one additional surface for receiving additional components.

* * * * *

UNITED STATES PATENT AND TRADEMARK OFFICE
CERTIFICATE OF CORRECTION

PATENT NO. : 12,208,837 B2  
APPLICATION NO. : 18/566364  
DATED : January 28, 2025  
INVENTOR(S) : Stack et al.

Page 1 of 1

It is certified that error appears in the above-identified patent and that said Letters Patent is hereby corrected as shown below:

In the Claims

In Column 7, Line 60, in Claim 5, after "wherein", insert --the--

Signed and Sealed this  
First Day of April, 2025

Coke Morgan Stewart  
*Acting Director of the United States Patent and Trademark Office*